United States Patent
Casagrande

(10) Patent No.: US 10,701,455 B2
(45) Date of Patent: Jun. 30, 2020

(54) SELECTIVELY DELAYING CONTROL WORD DELIVERY FOR PIRACY IDENTIFICATION

(71) Applicant: Echostar Technologies L.L.C., Englewood, CO (US)

(72) Inventor: Steven Michael Casagrande, Castle Rock, CO (US)

(73) Assignee: Dish Technologies L.L.C., Englewood, CO (US)

( * ) Notice: Subject to any disclaimer, the term of this patent is extended or adjusted under 35 U.S.C. 154(b) by 252 days.

(21) Appl. No.: 15/856,812

(22) Filed: Dec. 28, 2017

(65) Prior Publication Data

US 2018/0213297 A1 Jul. 26, 2018

Related U.S. Application Data

(60) Provisional application No. 62/441,285, filed on Dec. 31, 2016.

(51) Int. Cl.
| | |
|---|---|
| *H04L 29/06* | (2006.01) |
| *H04N 21/6334* | (2011.01) |
| *H04N 21/258* | (2011.01) |
| *H04N 21/4623* | (2011.01) |
| *H04N 21/418* | (2011.01) |
| *G06F 21/16* | (2013.01) |
| *H04N 21/254* | (2011.01) |

(52) U.S. Cl.
CPC ....... *H04N 21/63345* (2013.01); *G06F 21/16* (2013.01); *H04N 21/2541* (2013.01); *H04N 21/2585* (2013.01); *H04N 21/4182* (2013.01); *H04N 21/4623* (2013.01)

(58) Field of Classification Search
CPC .......... H04N 21/4405; H04N 21/2347; H04N 21/633; H04L 2209/60
See application file for complete search history.

(56) References Cited

U.S. PATENT DOCUMENTS

2013/0212374 A1* 8/2013 Delerablee ......... H04N 21/2585
713/150

FOREIGN PATENT DOCUMENTS

WO 2015063308 A1 5/2015

OTHER PUBLICATIONS

European Patent Office International Searching Authority, International Search Report and Written Opinion for International Application No. PCT/US2017/067055 dated Mar. 7, 2018.

(Continued)

*Primary Examiner* — Izunna Okeke
(74) *Attorney, Agent, or Firm* — Lorenz & Kopf LLP

(57) ABSTRACT

Systems, devices and automated processes detect piracy of broadcast television signals through selective delay of decrypted code words that are used to render satellite or other received television signals. Smart cards or similar access control hardware are programmed to selectively delay delivery of cryptographic code words based upon the identity of the receiver device. The delayed delivery of the code words produces intentional glitches in the content rendered by the receiver, thereby allowing viewers of the rendered content to ascertain the identity of the device.

10 Claims, 3 Drawing Sheets

(56) References Cited

OTHER PUBLICATIONS

Bertrand Chupeau et al., "Forensic Characterization of Pirated Movies: Digital Cinema Cam vs. Optical Disc Rip," 2014 IEEE International Workshop on Information Forensics and Security (WIFS), Dec. 1, 2014, pp. 155-160, XP55202277, DOI: 10.1109/WIFS.2014/084320 ISBN: 978-1-4799-8882-2.

Konstantinos Markantonakis et al., "Attacking smart card systems: Theory and practice," Information Security Technical Report, Elsevier Advanced Technology, Amsterdam, NL, vol. 14, No. 2, May 1, 2009, pp. 46-56, XP026459271, ISSN: 1363-4127 [retrieved on Jul. 10, 2009].

Hongxia Jin et al., "Traitor Tracing for Prerecorded and Recordable Media," DRM '04, ACM, US, Oct. 25, 2004, pp. 83-90, XP058233917, DOI: 10.1145/1029146.1029160 ISBN: 978-1-58113-969-3.

\* cited by examiner

| Bit | Value | Time | Glitch if VALUE=1 |
|---|---|---|---|
| 0 | 1 | 12:00:15 | Yes |
| 1 | 0 | 12:02:00 | No |
| 2 | 0 | 12:09:45 | No |
| 3 | 0 | 12:10:30 | No |
| 4 | 1 | 12:11:15 | Yes |
| 5 | 1 | 12:17:30 | Yes |
| 6 | 0 | 12:19:45 | No |
| 7 | 1 | 12:21:15 | Yes |

SELECTIVELY DELAYING CONTROL WORD DELIVERY FOR PIRACY IDENTIFICATION

PRIORITY CLAIM

This application claims priority to U.S. Provisional Patent Application Ser. No. 62/441,285 filed on Dec. 31, 2016, which is incorporated herein by reference.

TECHNICAL FIELD

The following discussion generally relates to securing broadcast television content, including direct broadcast satellite (DBS) signals. More particularly, the following discussion relates to systems, devices and processes to automatically identify piracy of broadcast television content through selective delay of control word delivery.

BACKGROUND

Piracy of direct broadcast satellite (DBS) and other broadcast television signals is an ongoing problem. As smart card devices have become more powerful and secure, signal pirates have evolved to more complicated schemes to steal satellite programming. One common scheme in current use involves a pirate paying for one legitimate subscription to the pirated service and using that subscription to siphon security codes that can be sent to other non-paying users, typically as an Internet key service (IKS). Participants in the IKS, in turn, typically use a "free to air" (FTA) satellite receiver device that is not subscribed to paid programming, so it does not descramble programming on its own. By receiving control words (CW) over the Internet, however, the unauthorized user may be able to descramble received satellite signals for which he or she has not paid.

It is therefore desirable to create systems and methods to detect the sources of pirated satellite signals so that freeloading can be prevented. These and other desirable features and characteristics will become apparent from the subsequent detailed description and the appended claims, taken in conjunction with the accompanying drawings and this background section.

SUMMARY

Various embodiments provide systems, devices and automated processes to detect piracy of broadcast television signals through selective delay of decrypted code words that are used to render satellite or other received television signals. Smart cards or similar access control hardware are programmed to selectively delay delivery of cryptographic code words based upon the identity of the receiver device. The delayed delivery of the code words produces intentional glitches in the content rendered by the receiver, thereby allowing viewers of the rendered content to ascertain the identity of the device.

In some embodiments, an automated process is performed by a processor of a security device operating within a television receiver. The process suitably comprises: receiving an electronic control message that comprises a cryptographic key and a conditional delay instruction referencing at least one bit of an identifier associated with the security device; decrypting the electronic control message to extract the cryptographic key and the conditional delay instruction; executing the conditional delay instruction to determine if the at least one bit of the identifier associated with the security device matches a test value; and selectively delaying delivery of the extracted cryptographic key to the television receiver if the at least one bit of the identifier associated with the security device matches the test value, and otherwise not delaying the delivery of the extracted cryptographic key to the television receiver.

Other embodiments provide security devices operating within DBS or other television receivers. The security device suitably includes a processor that is configured to execute an automatic process to selectively delay code words used in decrypting of received television content. The process suitably comprises: receiving an electronic control message that comprises a cryptographic key and a conditional delay instruction referencing at least one bit of an identifier associated with the security device; decrypting the electronic control message to extract the cryptographic key and the conditional delay instruction; executing the conditional delay instruction to determine if the at least one bit of the identifier associated with the security device matches a test value; and selectively delaying delivery of the extracted cryptographic key to the television receiver if the at least one bit of the identifier associated with the security device matches the test value, and otherwise not delaying the delivery of the extracted cryptographic key to the television receiver.

Still other embodiments relate to computing hardware and automated processes associated with television uplink or broadcast systems. In one example, an automated process performed by processing hardware controls a television broadcast to television receivers that each comprise a security device having a unique digital identifier. The process suitably comprises: formatting a plurality of electronic control messages that are decryptable by the security devices in the television receiver to grant access to the television broadcast, wherein at least some the plurality of electronic control messages comprise a cryptographic key and a conditional delay instruction referencing at least one bit of the unique digital identifier that instructs each security device to selectively delay delivery of the cryptographic key to its associated television receiver if the at least one bit of the unique digital identifier that is identified in the conditional delay instruction matches a test value; and transmitting each of the formatted electronic control messages as part of the television broadcast to intentionally create visible glitches in television programming rendered only by those television receivers having the at least one bit of the unique digital identifier matching the test value.

Further examples of systems, devices and automated processes and their various equivalents are described in the detailed description below.

BRIEF DESCRIPTION OF THE DRAWING FIGURES

Various example embodiments will hereinafter be described in conjunction with the following drawing figures, wherein like numerals denote like elements, and FIG. 1 is an example block diagram of a secure direct broadcast satellite receiver;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments exploit the delayed delivery of essential decoder data (e.g., control words), thereby intentionally causing a visible but temporary "glitch" in the video playback. This glitching can be correlated to one or more bits of the security device's identifier (UA), for example, and timed as appropriate so that the timings of the visible glitches indicate portions of the UA. By observing the pirate video stream, then, and recognizing when the glitches are occurring, the UA (or other identity) of the source can be determined.

Figure 1:
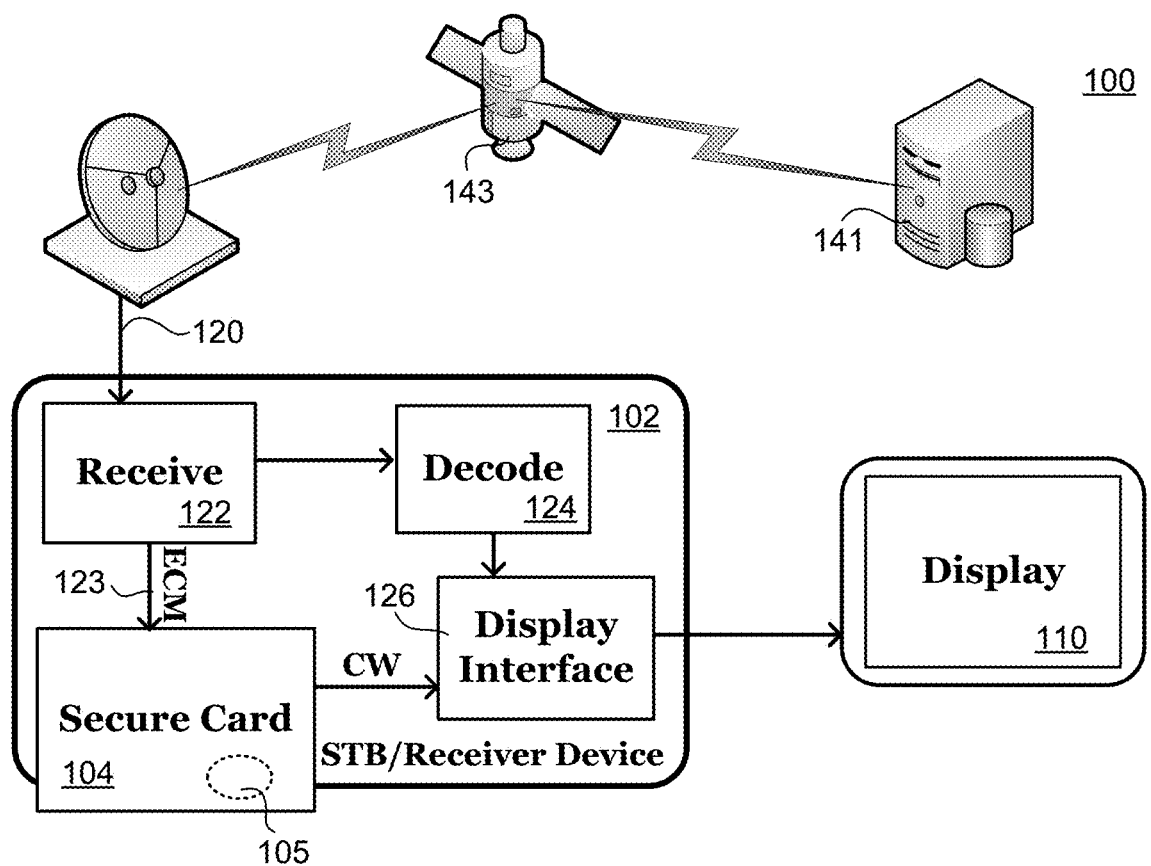

Turning now to the drawings and with initial reference to FIG. 1, an example satellite receiver/decoder system 100 suitably includes a set top box or other receiver 102 that receives direct broadcast satellite (DBS) signals 120 from a satellite 143, as appropriate. Signals 120 are initially encoded and formatted for broadcast by an uplink encoder system 141 that is typically operated by a cable or DBS system operator. Uplink encoder system 141 typically includes conventional hardware and software resources (e.g., processors, data storage, input/output interfaces, etc.) for formatting television broadcasts, including processing of access control features as described more fully below.

Receiver 102 typically includes a smart card or similar security processor 104 that contains separate processing capabilities and secure memory for use in decrypting or otherwise descrambling received signals 120. For purposes of this document, all types of security processors 104 or other controlled access (CA) subsystems may be collectively referenced as "smart cards", recognizing that while smart cards are the most commonly-used security processors, other devices (e.g., specialized circuit boards, universal serial base (USB) based circuitry and/or the like) could be equivalently used. Other technologies may perform equivalent tasks and processes using equivalent structures to those described herein, even if such devices are not technically "smart cards".

Receiver device 102 typically includes a satellite receiver interface 122 that receives and demodulates signals 115 from a satellite (or from an outdoor unit (ODU) or the like). Demodulated signals typically contain an entitlement control message (ECM) 123 that contains the control word in encrypted format. ECMs 123 may be formatted by the encoder system 141 and included in broadcast content signals 120. Received ECMs 123 are provided by receiver 102 to the smartcard 104, which is able to decrypt the control word from the ECM 123 and supply it to a video decoder or descrambler 124 to descramble the received content signals. Each control word is typically valid for a cryptoperiod of about 15 seconds or so, although other embodiments could be designed for shorter or longer cryptoperiods. This means that a new ECM 123 supplying a new control word would need to be provided every fifteen seconds or so to prevent glitching of the received signal. In practice, many ECMs 123 contain two (or more) control words in case a subsequent ECM 123 is lost, corrupted or delayed in processing.

The control word is provided to a decoder/descrambler 124 as appropriate. The decoder 124 uses the control word to decrypt the program signals that are received from receiver interface 122. Although FIG. 1 shows decoder 124 as being part of the receiver 102, equivalent embodiments may implement decoder 124 within the smartcard 104, as desired. This could allow even more secure control over the control words, as appropriate.

For a legitimate subscriber, the control word is used to descramble the received content, and the decoded content is conventionally rendered by a display interface 126 for presentation on a television or other display 110. Various modern set top box devices 102 may additionally or alternately store decoded content on a digital video recorder (DVR) for time shifted playback. Some embodiments could also include transcoder circuitry for placeshifting, in which the program stream is securely streamed to a phone, tablet or other device for remote viewing.

As noted above, the processing circuitry 105 in the smartcard 104 is able to decrypt the ECM 123 and supply the decrypted control word to the descrambler within the allotted time. In a pirate's receiver, these control words may be tapped off and rebroadcast over the Internet or another network for use by any number of other devices who have not subscribed to the pay service and are therefore unable to decrypt their own control words. Illegitimate subscribers may also attempt to rebroadcast the decoded video content on the Internet or another network so that unpaying viewers can watch same content. This is particularly prevalent for more expensive premium content, such as boxing matches or other pay-per-view events, although pirates have attempted to create their own video streams of less expensive content (e.g., subscription content) as well.

Each smartcard 104 typically has a unique identifier commonly referenced as the "UA". In many conventional smartcards 104, the UA is a 32-bit digital value, although only about 22-24 bits are commonly used. The concepts set forth herein would equivalently apply to digital identifiers of any length.

In various embodiments, the processing circuitry 105 in the smartcard can be commanded to delay delivery of control words for a relatively short period of time, typically just slightly longer than the cryptoperiod (e.g., a sixteen second delay for a fifteen second cryptoperiod). This will ensure that at least some content cannot be descrambled in real time, thereby leading to a visible "glitch" in the programming. Such glitches often resemble macroblocks or the like when they are presented to the viewer. Typically, these glitches will be short in duration and can be spaced at relatively distant intervals from each other to prevent undue annoyance to legitimate subscribers.

Figure 2:
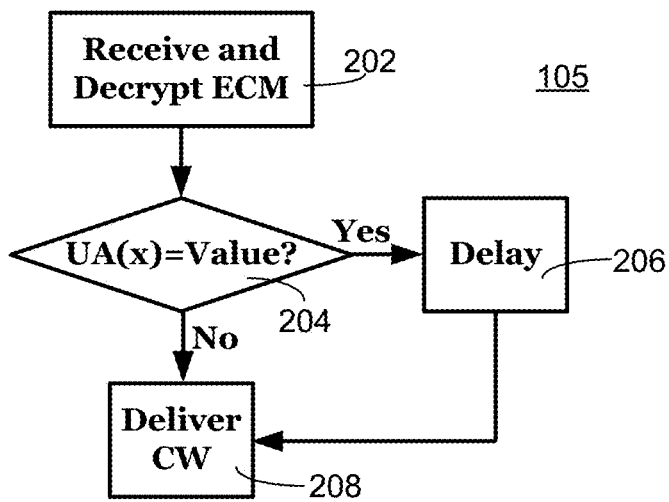
FIG. 2 illustrates an example process to selectively delay control word delivery in a satellite receiver.

FIG. 2, for example, shows an example process that can be executed by processing logic 105 within smartcard 104. Referring to the flowchart of FIG. 2, logic 105 in the smart card 104 suitably receives the ECM from the receiver interface 122 and decrypts the control word as appropriate (function 202). The received and decrypted ECM 123 will include the code word (CW) for decrypting the content. In various embodiments, ECM 123 also includes conditional instructions similar to those presented above to generate delays in reporting control words if the CA meets certain criteria (function 204). If one or more bits of the UA fit a certain pattern, for example, then the control word can be delayed, as described above (function 206). Otherwise the control word is delivered at its normal time, as appropriate (function 208). Generally speaking, if a probed bit (x) of the UA is equal to a test value (function 204), then the control word is delayed by an appropriate time (function 206), thereby creating a glitch in the content rendered by receiver 102. If the probed bit of the UA does not match the probed value, then no delay is instigated, and the CW is delivered to the receiver 102 normally (function 208), thereby avoiding delay-induced glitches in the rendered content.

Logic 105 may be programmed in software or firmware, or in any sort of programmable hardware logic as desired. In various embodiments, logic 105 is programmed in secure EEPROM or the like to prevent malicious tampering. In other embodiments, logic 105 can be delivered to the smartcard 104 using an entitlement management message (EMM) or the like. Such messages are typically used to update encryption keys and the like, and could also be used to install new logic such as the conditional delay logic 105 described herein. Other embodiments may be installed, organized and/or operated in any other manner.

The delayed delivery of control words can be further conditioned upon any number of different factors. In various embodiments, the delay (and hence the glitch) is created based upon a portion of the smart card's UA. If a particular bit of the UA is a selected value (e.g., "i"), for example, then delivery can be delayed and a glitch will be created. If that bit of the UA is the opposite value ("o", in this case), then no glitch would be created. Issuing conditional delay commands to the smartcard circuitry 105, then, can create visual glitches in the program output that can be observed and correlated to the UA of the pirate device.

Figure 3:
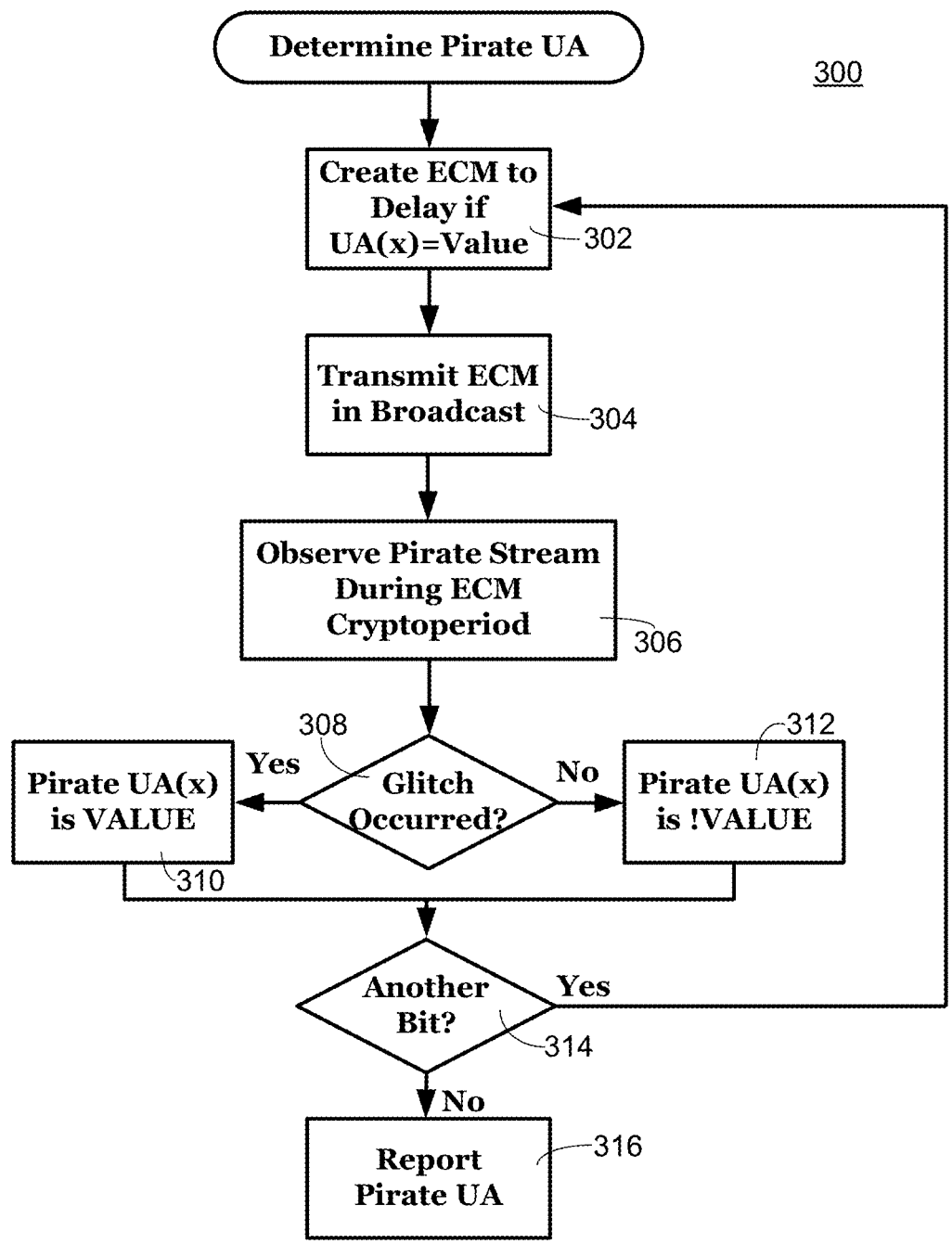
FIG. 3 illustrates an example process to control the selective delay of control words for piracy detection.

FIG. 3 shows an example process 30o to use selective delays to determine the identity of a smartcard 104 or device 102 that is producing a video stream. By generating conditional glitches at known times and then observing the times that visible glitches are produced in the stream, the identity of the device producing the stream can be readily determined. Process 300 may be executed by a computer system or the like executing under the control of a broadcaster or content aggregator who has the ability to encode ECMs in response to prior observations, such as system 141 in FIG. 1 or the like. By generating ECMs in response to previous observations, the impact upon legitimate subscribers can be reduced, albeit at the expense of some occasional time delay.

As noted above, ECM messages are create to conditionally delay the delivery of control words if one or more conditions are met (function 302). In the example of FIG. 3, the delay is created if a certain bit (x) of the CA is a particular value (v) (e.g., a zero or one). The ECM is broadcast as part of the television content (function 304) so it is received by a large number of recipients, including the pirate.

The pirate video stream is then watched at the time of the delay to identify if a glitch is produced or not (function 306). If a glitch is produced (function 308), then the condition of the ECM has been met, and more information is learned about the pirate's identity (function 310). Indeed, if no glitch is produced, then information is still learned: namely, that the bit in question is the opposite of the tested value (function 312).

Processing continues (function 314) until sufficient data has been collected to identify the pirate's CA or other identifier. This information may be reported (function 316) as appropriate, e.g., by generating a message or entry that can be processed by a human operator.

The various functions of process 300 may be performed by a computer or other processing machinery as desired. While some embodiments may use human operators to indicate whether a glitch is produced or not, other embodiments could readily automate this function using conventional video or image analysis techniques. That is, the visible glitches should be readily detectable by automated processes and machinery so that further adjustments to the ECMs could be made. Other embodiments could alternately accept a digital input via a user interface that indicates whether glitches have occurred, and/or the times of any observed glitches, as desired. Any numbers of inputs could be provided into process 300 using any number of interfaces or automated processing, as desired.

Figure 4:
FIG. 4 is a table that shows an illustrative example of how scheduling delayed delivery of control words can correlate to the identity of a pirate device.

Moreover, two or more bits may be simultaneously tested to reduce the number of legitimate boxes that are affected at any time. In particular, if a glitch is recognized on an early test, then it may be beneficial to continue testing the earlier bit at the same time as other bits to minimize effects on legitimate subscribers. In FIG. 4, for example, the first glitch is recognized at 12:00:15 based upon bit(0)=1, and no glitches were identified at 12:02:00 or 12:09:45. It may be desirable to use this information in future tests. For example, the 12:10:30 test of bit 3 could be commanded as:

IF (Bit(0)=1 AND Bit(1)=0 AND Bit(2)=0 AND Bit(3)=0 THEN Delay, else NoDelay

This would tend to produce glitches in only about 1/16 of the devices, instead of half of the devices (as would be expected if the test considered only bit 3). Other embodiments may be controlled and refined as desired, and as described more fully below.

If multiple unknown bits are simultaneously tested, it may be desirable to create longer glitches (e.g., delays of a second or two beyond the cryptoperiod) so that glitches are easier to detect. Delay commands could also be manually or automatically configured to "hone in" on pirates in response to observed glitches, as described more fully below. Moreover, the length of the delay can be adapted as desired. In multi-bit tests, for example, the amount of delay could be adapted based on the value of all the bits set. If two different bits are probed, for example, the digital result of those two bits could be any of four states: 00, 01, 10 or 11. If each of these states were matched to different delay periods (e.g., one to four seconds, respectively), the observed delay between the code word and the resultant glitch would indicate the probed value. To continue this example, a three second delay would indicate that a "10" state for the two probed bits. This allows a single probe to identify multiple bit values, if desired. A similar embodiment could provide a standard delay time if any of the tested bits are set, and then hone in on which bit during subsequent tests based upon observation.

Other embodiments could modify these techniques in any way. By varying the delay time, a single probe can test multiple bits, but at the expense of slightly longer delays for some users. This technique may require better observation of timing at the monitoring site as well. The single delay technique, on the other hand, uses additional probes to individually probe each of the bits. Note, however, that it may not be necessary to probe each of the bits if the initial multi-bit probe provides a negative result (e.g., if one of the two tested bits is relevant and the first bit tests negative in subsequent testing, then there is no need to test the second bit). This could provide a statistical likelihood of fewer total probes in some implementations. Again, these concepts could be adapted in any number of ways to accommodate multiple bit values that are probed using any equivalent scheme or technique.

FIG. 4 illustrates one example of a scheme for determining an eight bit UA based upon induced conditional glitching. It should be recognized at the outset that this is just one example for illustrative purposes: practical implementations may consider any number of bits in any order (including simultaneous probes of multiple bits) according to any time schedule.

Referring now to the example illustrated in FIG. 4, a table 400 shows how the various bits of the UA can be conditionally glitched at different times. By observing the times of the glitches in the video signal, the UA can be determined. In the illustrated example, the UA is eight bits: 10110001. Each of the eight bits is conditionally glitched at a different time while the pirated video stream is watched to identify times that glitches occur. Bit zero, for example, is conditionally glitched (e.g., "IF bit(0)=1, then Delay, ELSE NoDelay") at the time 12:00:15. All cards 104 having a "1" values for that UA bit will glitch (50% on average) after receiving the delay command, including the offending box in this example. Delay instructions relating to other bits can be issued according to any time schedule, including random times. Although FIG. 4 shows the bits being tested in order, this is not necessary. The different bits may be tested in any pattern, and at any interval.

After all eight bits (in this example) have been tested according to the schedule, the observer will have noted that glitches occurred at 12:00:15, 12:11:15, 12:17:30 and 12:21:15, thereby indicating that the UA value is 10110001. Of course equivalent embodiments could be formulated by varying the particular bits that are glitched, the times that the bits are glitched, and/or the number of bits that are glitched or not glitched. Further, it may not be necessary to test all of the bits if the offending device can be identified through fewer tests. If only a subset of UA bits is used, for example, then it would only be necessary to probe the relevant bits, without a need to probe any unused or additional bits.

As noted above, FIG. 4 is intended only as an example to illustrate how selective delays in control word delivery can be scheduled to detect the identity of a particular device. Practical implementations may vary the order of tests, the scheduling of tests, the combining of tests and/or the like across any number of bits. Further modifications could consider multiple bits, a subset of bits, or any number of different parameters.

The various embodiments described herein may be enhanced or otherwise adapted in any manner. Further, equivalent embodiments could be implemented in other smartcard systems or devices other than DBS television broadcasts. Cable television broadcasts or over-the-top (OTT) video streams, for example, could make use of similar functions and features if the receiving device is secured by a smart card or similar construct. Other embodiments could be equivalently implemented within video game players, smart phones, computer systems and/or the like, as desired.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a processor of a security device operating within a television receiver, the process comprising:

receiving an electronic control message that comprises a cryptographic key and a conditional delay instruction referencing at least two bits of an identifier associated with the security device;

decrypting the electronic control message to extract the cryptographic key and the conditional delay instruction;

executing the conditional delay instruction to determine if the at least two bits of the identifier associated with the security device matches a test value; and temporarily delaying delivery of the extracted cryptographic key to the television receiver if the at least one bit of the identifier associated with the security device matches the test value to thereby intentionally cause a momentary visible glitch in playback of television programming rendered by the television receiver, and otherwise not delaying the delivery of the extracted cryptographic key to the television receiver, and wherein the delaying comprises adjusting a length of delay based upon a number of the at least two bits that matches the test value.

2. The automated process of claim 1 wherein the delaying comprises delaying the delivery of the extracted cryptographic key based upon a number of the at least two bits that matches the test value.

3. A security device operating within a television receiver, the security device comprising a processor configured to execute an automatic process comprising:

receiving an electronic control message that comprises a cryptographic key and a conditional delay instruction referencing at least one bit of an identifier associated with the security device;

decrypting the electronic control message to extract the cryptographic key and the conditional delay instruction;

executing the conditional delay instruction to determine if the at least two bits of the identifier associated with the security device matches a test value; and temporarily delaying delivery of the extracted cryptographic key to the television receiver if the at least two bits of the identifier associated with the security device matches the test value to thereby intentionally cause a momentary visible glitch in playback of television programming rendered by the television receiver, and otherwise not delaying the delivery of the extracted cryptographic key to the television receiver, wherein the delaying comprises adjusting a length of delay based upon a number of the at least two bits that matches the test value.

4. The security device of claim 3 wherein the delaying comprises delaying the delivery of the extracted cryptographic key based upon a number of the at least two bits matches the test value.

5. An automated process performed by processing hardware that controls a television broadcast to television receivers that each comprise a security device having a unique digital identifier, the process comprising:

formatting a plurality of electronic control messages that are decryptable by the security devices in the television receiver to grant access to the television broadcast, wherein at least some the plurality of electronic control messages comprise a cryptographic key and a conditional delay instruction referencing at least two bits of the unique digital identifier that instructs each security device to temporarily delay delivery of the cryptographic key to its associated television receiver if the at least two bits of the unique digital identifier that is identified in the conditional delay instruction matches a test value to thereby intentionally cause a momentary visible glitch in playback of television programming rendered by the television receiver, wherein a length of the delay is adjusted based upon a number of the at least two bits that matches the test value; and transmitting each of the formatted electronic control messages as part of the television broadcast to intentionally create visible glitches in television programming rendered only by those television receivers having the at least two bits of the unique digital identifier matching the test value.

6. The automated process of claim 5 further comprising automatically identifying the visible momentary glitches in the television programming rendered by one of the television receivers to thereby recognize the unique digital identifier associated with that television receiver.

7. The automated process of claim 5 wherein the formatted electronic control messages are transmitted according to a predetermined time schedule.

8. The automated process of claim 7 further comprising automatically identifying times that the visible glitches occur in the television programming rendered by one of the television receivers, and comparing the times that visible glitches occur to the predetermined time schedule to thereby recognize the unique digital identifier associated with that television receiver.

9. The automated process of claim 5 further comprising automatically identifying the visible glitches in the television programming rendered by one of the television receivers and automatically adapting the conditional delay instructions of subsequent electronic control messages based upon the visible glitches that are identified in the television programming.

10. The automated process of claim 5 wherein the conditional delay instruction delays the delivery of the cryptographic key to the television receiver based upon a number of the at least two bits matches the test value.

* * * * *